(12) United States Patent
Hasegawa

(10) Patent No.: US 10,996,608 B1
(45) Date of Patent: May 4, 2021

(54) SHEET DISCHARGE DEVICE, SHEET DISCHARGE METHOD, AND IMAGE FORMING APPARATUS

(71) Applicant: TOSHIBA TEC KABUSHIKI KAISHA, Tokyo (JP)

(72) Inventor: Satoshi Hasegawa, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/817,513

(22) Filed: Mar. 12, 2020

(51) Int. Cl.
| | |
|---|---|
| G03G 15/00 | (2006.01) |
| G06K 15/00 | (2006.01) |
| B65H 31/24 | (2006.01) |
| B65H 43/00 | (2006.01) |
| G03G 15/20 | (2006.01) |

(52) U.S. Cl.
CPC ......... *G03G 15/6547* (2013.01); *B65H 31/24* (2013.01); *B65H 43/00* (2013.01); *G03G 15/2028* (2013.01); *G03G 15/6552* (2013.01); *G06K 15/403* (2013.01); *B65H 2408/114* (2013.01)

(58) Field of Classification Search
CPC ........... G03G 15/2039; G03G 15/6547; G03G 15/6538; G03G 15/6541; G06K 15/403; B65H 2408/114; B65H 2301/162
USPC ................................................. 399/69, 404
See application file for complete search history.

(56) References Cited

U.S. PATENT DOCUMENTS

| | | | | |
|---|---|---|---|---|
| 5,895,142 A | * | 4/1999 | Takahashi | G03G 15/6547 358/401 |
| 6,215,977 B1 | * | 4/2001 | Otani | B41J 13/00 399/407 |
| 6,496,278 B1 | * | 12/2002 | Tamura | G06K 15/02 358/1.12 |
| 8,099,038 B2 | * | 1/2012 | Matoba | H04N 1/00466 399/404 |
| 2017/0253447 A1 | * | 9/2017 | Miyata | B65H 3/446 |
| 2020/0262672 A1 | * | 8/2020 | Yamada | G03G 15/6547 |

FOREIGN PATENT DOCUMENTS

JP 2016-071139 A 5/2016

* cited by examiner

*Primary Examiner* — Robert B Beatty
(74) *Attorney, Agent, or Firm* — Foley & Lardner LLP

(57) ABSTRACT

A sheet discharge device includes at least one sheet discharge tray, a sheet discharge position adjustment actuator, and a controller. The sheet discharge tray receives discharged sheets. The discharge position adjustment actuator adjusts discharge positions of the discharged sheets on the at least one sheet discharge tray. The controller compares a first rotation amount of first print data printed on a first sheet with a second rotation amount of second print data printed on a second sheet. In response to a determination that the first rotation amount is different than the second rotation amount, the controller controls the sheet discharge position adjustment actuator to (a) discharge the first sheet to a first discharge position and (b) discharge the second sheet to a second discharge position different than the first discharge position.

17 Claims, 13 Drawing Sheets

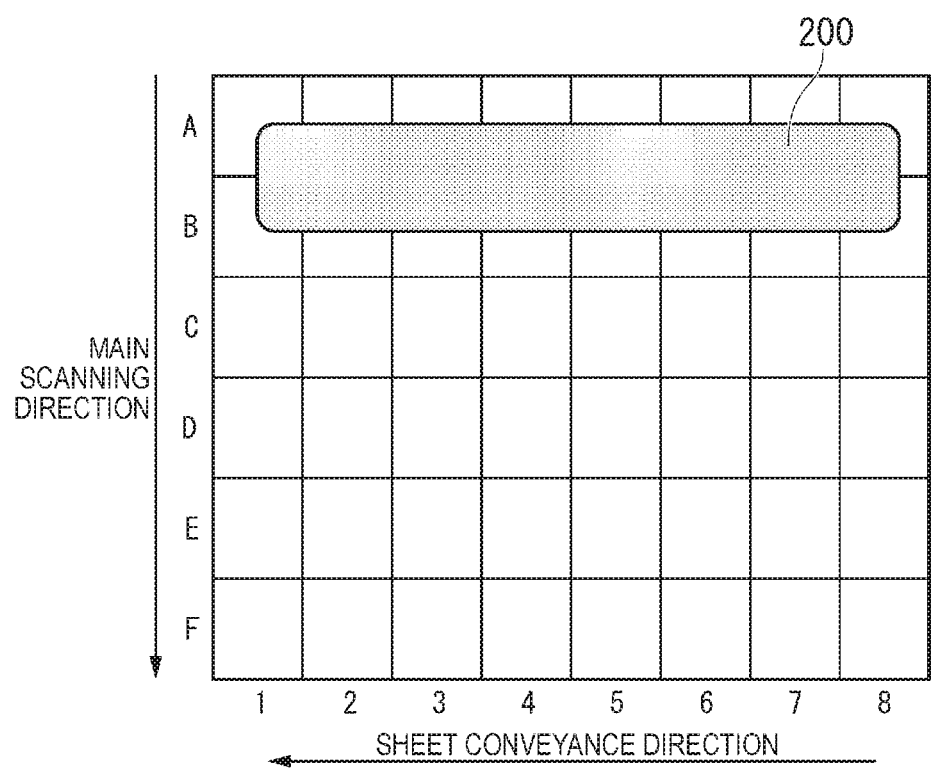

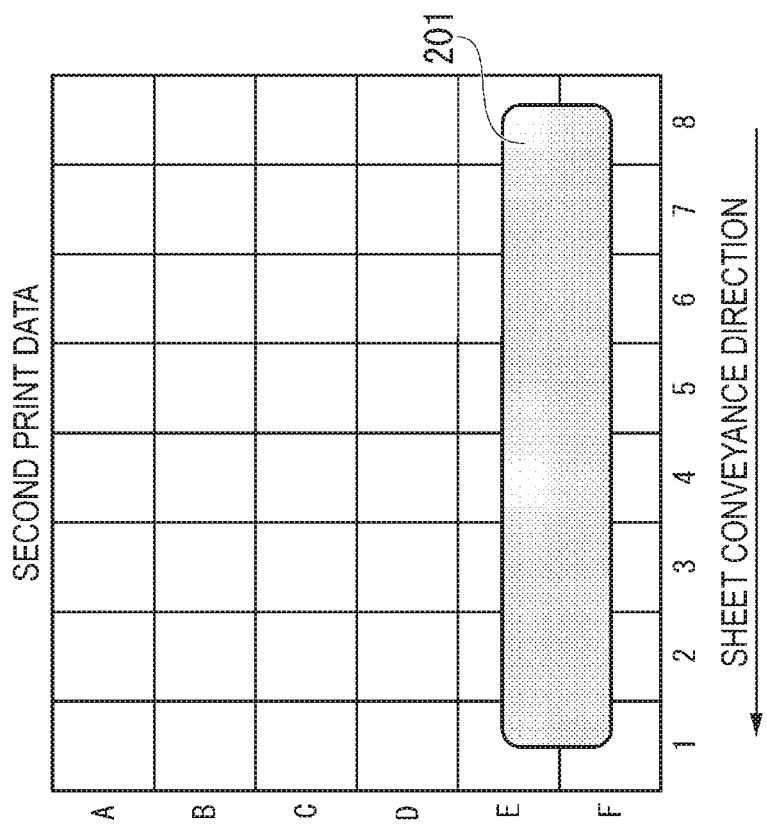
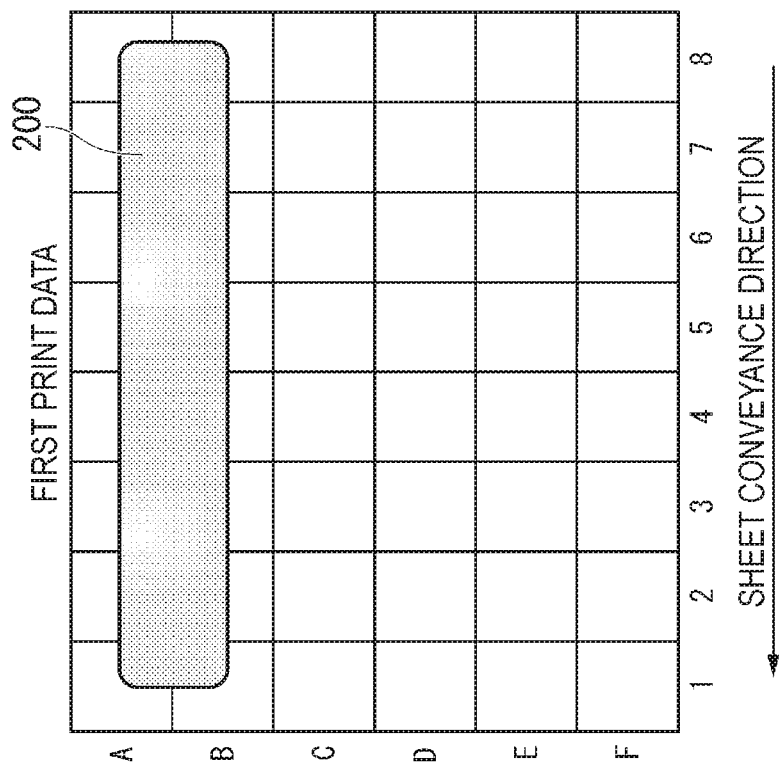

FIG. 8A

| | F | E | D | C | B | A |
|---|---|---|---|---|---|---|
| ENERGIZATION INFORMATION OF FRONT PART OF FIRST PRINT DATA | 0 | 0 | 0 | 0 | 1 | 1 |
| ENERGIZATION INFORMATION OF REAR PART OF FIRST PRINT DATA | 0 | 0 | 0 | 0 | 1 | 1 |

FIG. 8B

| | F | E | D | C | B | A |
|---|---|---|---|---|---|---|
| ENERGIZATION INFORMATION OF FRONT PART OF SECOND PRINT DATA (0° ROTATION) | 1 | 1 | 0 | 0 | 0 | 0 |
| ENERGIZATION INFORMATION OF REAR PART OF SECOND PRINT DATA (0° ROTATION) | 1 | 1 | 0 | 0 | 0 | 0 |

FIG. 9

| | F | E | D | C | B | A |
|---|---|---|---|---|---|---|
| ENERGIZATION INFORMATION OF FRONT PART OF SECOND PRINT DATA (180° ROTATION) | 0 | 0 | 0 | 0 | 1 | 1 |
| ENERGIZATION INFORMATION OF REAR PART OF SECOND PRINT DATA (180° ROTATION) | 0 | 0 | 0 | 0 | 1 | 1 |

FIG. 12

|  | F | E | D | C | B | A |
|---|---|---|---|---|---|---|
| ENERGIZATION INFORMATION OF REAR PART OF FIRST PRINT DATA | 0 | 0 | 0 | 0 | 1 | 1 |
|  | & | & | & | & | & | & |
| ENERGIZATION INFORMATION OF FRONT PART OF SECOND PRINT DATA (0° ROTATION) | 1 | 1 | 0 | 0 | 0 | 0 |
|  | = | = | = | = | = | = |
| OPERATION RESULT | 0 | 0 | 0 | 0 | 0 | 0 |

FIG. 13

|  | F | E | D | C | B | A |
|---|---|---|---|---|---|---|
| ENERGIZATION INFORMATION OF REAR PART OF FIRST PRINT DATA | 0 | 0 | 0 | 0 | 1 | 1 |
|  | & | & | & | & | & | & |
| ENERGIZATION INFORMATION OF FRONT PART OF SECOND PRINT DATA (180° ROTATION) | 0 | 0 | 0 | 0 | 1 | 1 |
|  | = | = | = | = | = | = |
| OPERATION RESULT | 0 | 0 | 0 | 0 | 1 | 1 |

US 10,996,608 B1

SHEET DISCHARGE DEVICE, SHEET DISCHARGE METHOD, AND IMAGE FORMING APPARATUS

FIELD

Embodiments described herein relate generally to a sheet discharge device, a sheet discharge method, and an image forming apparatus.

BACKGROUND

Conventionally, when printing an image, the image is sometimes rotated in order to save power by reducing the size of a heating region in a fixing device. In such a case, sheets having a difference in rotation amount of 180° may not be easily distinguished from each other in a discharged state. For that reason, it was necessary to make a distinction by visually observing the image on a printing surface. For example, such a problem occurs when the rotation amounts are 0° and 180°, or when the rotation amounts are 90° and 270°.

Such a problem is not limited to an apparatus for the purpose of power saving in a fixing device as described above. This is a problem common to apparatuses that discharge a sheet in a state where the image on the printing surface is rotated, for some purpose.

DESCRIPTION OF THE DRAWINGS

FIG. 5 is a diagram for illustrating a method for generating energization information in the embodiment;

FIG. 6 is a diagram illustrating an example of energization information generated based on print data illustrated in FIG. 5;

FIGS. 7A and 7B are diagrams for illustrating a process when a plurality of pieces of print data are present in the embodiment;

FIGS. 8A and 8B are diagrams illustrating an example of energization information of each print data in the example of FIGS. 7A and 7B;

FIG. 9 is a diagram illustrating another example of energization information of each print data in the example of FIGS. 7A and 7B;

FIG. 12 is a diagram illustrating a result of a logical operation when the arrangement of the second print data is rotated by 0°;

FIG. 13 is a diagram illustrating a result of a logical operation when the arrangement of the second print data is rotated by 180°;

DETAILED DESCRIPTION

In general, according to one embodiment, a sheet discharge device includes a sheet discharge tray, a sheet discharge position adjuster, and a control unit. The sheet discharge tray receives a discharged sheet. The discharge position adjuster adjusts a discharge position of the sheet discharged to the discharge tray. The control unit controls the sheet discharge position adjuster to discharge a first sheet and a second sheet to different sheet discharge positions when a difference between a rotation amount of first print data printed on the first sheet and a rotation amount of second print data printed on the second sheet is a rotation amount that results in the same shape when a sheet to be printed is rotated.

Figure 1:
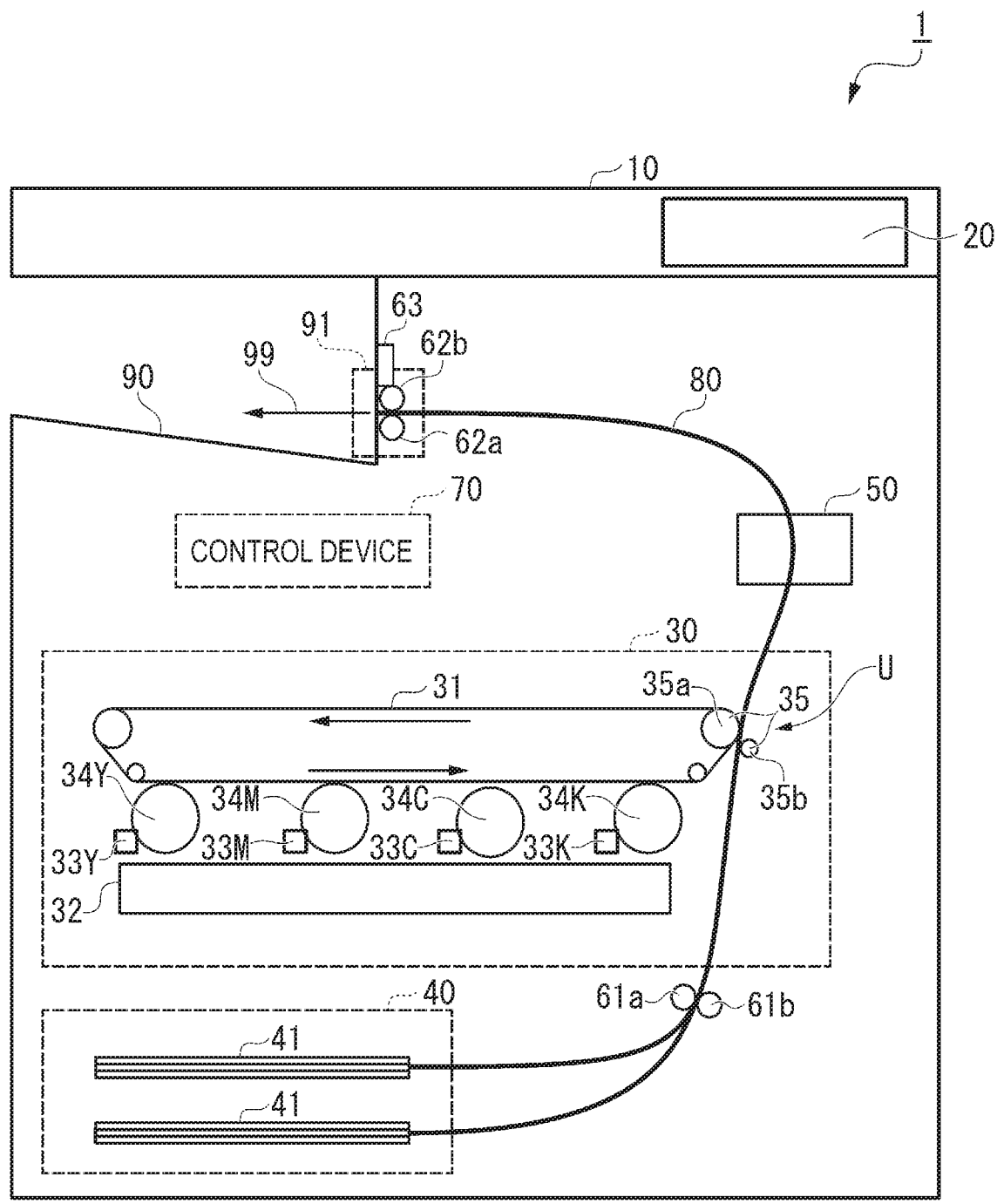
FIG. 1 is a diagram illustrating an example of an overall configuration of an image forming apparatus according to an embodiment.

Hereinafter, an image forming apparatus and a printing method according to an embodiment will be described with reference to the drawings. FIG. 1 is a diagram illustrating an example of an overall configuration of an image forming apparatus 1 according to an embodiment. The image forming apparatus 1 according to the embodiment is a multifunction peripheral (MFP). The image forming apparatus 1 executes printing by an image forming process and an image fixing process. The image forming process is a process of forming an image on a sheet. The image fixing process is a process of fixing an image formed on a sheet. The sheet is, for example, paper or the like on which characters and images are formed. The sheet may be any type of sheet as long as the image forming apparatus 1 can form an image thereon.

The image forming apparatus 1 includes an image reading unit 10, a control panel 20, an image forming unit 30, a sheet storage unit 40, a fixing device 50, conveyance rollers 61a and 61b, a control device 70, a sheet discharge tray 90, and a sheet discharge device 91. The image reading unit 10 reads an image to be read on a document based on brightness and darkness of light. For example, the image reading unit 10 reads an image printed on a sheet to be read set on a document reading table. The image reading unit 10 records read image information. The recorded image information may be transmitted to another information processing device via a network. The recorded image information may be formed as an image on a sheet by the image forming unit 30 as print data.

The control panel 20 (e.g., a user interface) includes a display unit (e.g., a display) and an operation unit (e.g., an input device). The display unit is a display device such as a liquid crystal display and an organic electro luminescence (EL) display. The display unit displays various pieces of information regarding the image forming apparatus 1 under the control of the control device 70. The operation unit includes a plurality of buttons and the like. The operation unit receives a user's operation. For example, the operation unit receives a print execution instruction. The operation unit outputs a signal corresponding to an operation performed by the user to the control device 70. The display unit and the operation unit may be configured as an integrated touch panel.

The image forming unit 30 executes the image forming process. Specifically, the image forming unit 30 forms an image on a sheet based on image information generated by the image reading unit 10 or image information received through a communication path. For example, the image forming unit 30 forms a toner image on a sheet using toner.

The image forming unit 30 includes a transfer belt 31, an exposure unit 32, a plurality of developing devices 33 (developing devices 33Y, 33M, 33C, and 33K), a plurality of photosensitive drums 34 (photosensitive drums 34Y, 34M, 34C, and 34K) and a transfer unit 35. The transfer belt 31 is an endless intermediate transfer body. The transfer belt 31 rotates in a direction indicated by an arrow (shown as counterclockwise) due to rotation of rollers.

The exposure unit 32 is provided at a position facing the photosensitive drum 34 between the developing device 33 and a charger. The exposure unit 32 irradiates the surface (e.g., a photoconductor layer) of each of the photosensitive drums 34Y, 34M, 34C, and 34K with laser light based on image information. A direction in which the photosensitive drum is scanned by laser light is the main scanning direction, and a direction orthogonal to the main scanning direction is the sub-scanning direction. For example, in this embodiment, the main scanning direction coincides with an axial direction of the photosensitive drum, and the sub-scanning direction coincides with a rotation direction of the transfer belt.

By irradiation of the laser light, charges on the surfaces (e.g., the photoconductor layers) of the photosensitive drums 34Y, 34M, 34C, and 34K disappear (e.g., are removed). As a result, electrostatic patterns are formed on the surfaces of the photosensitive drums 34Y, 34M, 34C, and 34K at the positions irradiated with the laser light. That is, electrostatic latent images are formed on the surfaces of the photosensitive drums 34Y, 34M, 34C, and 34K by the irradiation of the laser light by the exposure unit 32. The exposure unit 32 may use light emitting diode (LED) light instead of laser light. Light emission of the exposure unit 32 is controlled based on image information under the control of the control device 70.

The developing devices 33Y, 33M, 33C, and 33K supply toner to the photosensitive drums 34Y, 34M, 34C, and 34K. For example, the developing device 33Y develops an electrostatic latent image on the surface of the photosensitive drum 34Y with yellow (Y) toner. The developing device 33M develops the electrostatic latent image on the surface of the photosensitive drum 34M with magenta (M) toner. The developing device 33C develops the electrostatic latent image on the surface of the photosensitive drum 34C with cyan (C) toner. The developing device 33K develops the electrostatic latent image on the surface of the photosensitive drum 34K with black (K) toner.

The developing devices 33Y, 33M, 33C, and 33K form toner images as visible images on the photosensitive drums 34Y, 34M, 34C, and 34K. The toner images formed on the photosensitive drums 34Y, 34M, 34C, and 34K are transferred (i.e., as a primary transfer) onto the transfer belt 31 by a plurality of primary transfer rollers. A plurality of primary transfer rollers are provided at positions where the plurality of primary transfer rollers face the photosensitive drums 34Y, 34M, 34C and 34K with the transfer belt 31 interposed therebetween, respectively.

The transfer unit 35 includes a support roller 35a and a secondary transfer roller 35b. The transfer unit 35 transfers the toner image on the transfer belt 31 to a sheet 41 at a secondary transfer position U. The secondary transfer position U is a position where the support roller 35a and the secondary transfer roller 35b face each other with the transfer belt 31 interposed therebetween. The transfer unit 35 applies a transfer bias controlled by a transfer current to the transfer belt 31. The transfer unit 35 transfers the toner image on the transfer belt 31 onto the sheet 41 by the transfer bias. The transfer current is controlled by the control device 70.

The sheet storage unit 40 includes one or a plurality of sheet feed cassettes. The sheet feed cassette stores the sheets 41 of a predetermined size and a predetermined type. The sheet cassette includes a pickup roller. The pickup roller picks up the sheets 41 one by one from the sheet cassette. The pickup roller supplies the picked up sheets 41 to a conveying unit 80.

The fixing device 50 executes the image fixing process. Specifically, the fixing device 50 heats and presses the sheet 41 to fix an image (for example, toner image) formed on the sheet 41 to the sheet 41. The fixing device 50 in this embodiment includes a heating unit, which includes a plurality of heat-generating elements (e.g., heaters, heating elements) arranged in the main scanning direction and is capable of independently controlling heating of the plurality of heat-generating elements for each predetermined heating region. Each of the heat-generating elements generates heat by being individually energized. That is, an energized heat-generating element generates heat, and a non-energized heat-generating element does not generate heat. The heat-generating element gives thermal energy to the sheet 41. A press roller (e.g., a pressing roller) is provided at a position facing the heating unit. The press roller presses the sheet 41 against the heating unit.

The transport rollers 61a and 61b supply the sheet 41 fed from the sheet cassette to the image forming unit 30. The transport rollers 61a and 61b are installed at positions facing each other.

The sheet discharge tray 90 is provided at a position where the sheet 41 is discharged. The sheet discharge tray 90 supports the sheet 41 discharged to the outside of the image forming apparatus 1 from below.

The sheet discharge device 91 operates under the control of the control device 70, for example. The sheet discharge device 91 discharges a sheet to be processed by the image forming apparatus 1 to the sheet discharge tray 90. The sheet discharge device 91 may be provided integrally with the main body of the image forming apparatus 1 or may be configured as a dedicated device such as a finisher. When the sheet discharge device 91 is configured as a dedicated device, the sheet discharge device 91 may be connected to the image forming apparatus 1. The sheet discharge device 91 includes, for example, sheet discharge rollers 62a and 62b and a sheet discharge position adjuster 63 (e.g., an actuator). The sheet discharge rollers 62a and 62b discharge the sheet 41 on which the image is formed by the fixing device 50 to the sheet discharge tray 90. The sheet discharge rollers 62a and 62b are installed at positions facing each other. The sheet discharge position adjuster 63 adjusts the sheet discharge position of the discharged sheet.

The control device 70 controls each functional unit of the image forming apparatus 1. The conveying unit 80 conveys the sheet 41. The conveying unit 80 defines a conveyance path of the sheet 41 and includes a plurality of rollers. The conveyance path is a path along which the sheet 41 is conveyed. The rollers convey the sheet 41 by rotating under the control of the control device 70.

Figure 2:
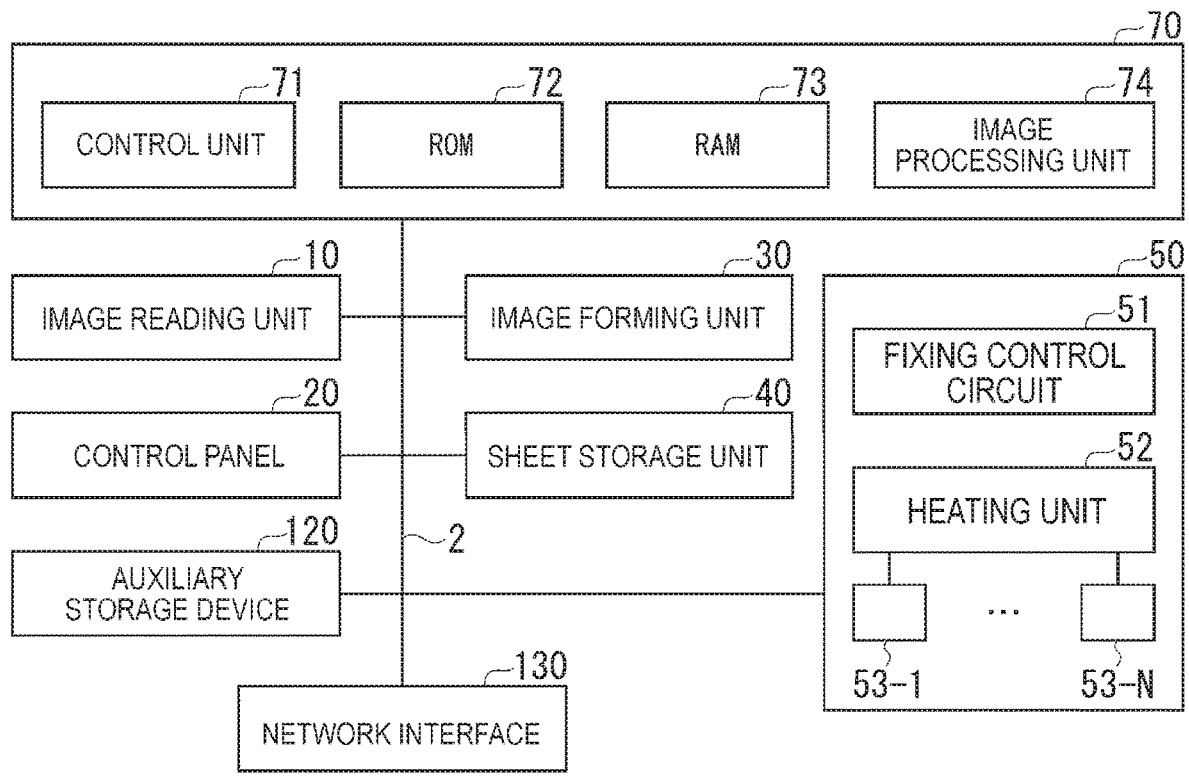
FIG. 2 is a block diagram illustrating a hardware configuration of the image forming apparatus of FIG. 1.

FIG. 2 is a block diagram illustrating a hardware configuration of the image forming apparatus 1 according to the embodiment. The hardware configuration of the image forming apparatus 1 shown in FIG. 2 represents only an exemplary embodiment, and in other embodiments different hardware configurations are utilized. The image forming apparatus 1 includes the image reading unit 10, the control panel 20, the image forming unit 30, the sheet storage unit 40, the fixing device 50, the control device 70, an auxiliary storage device 120, and a network interface 130. Each functional unit is connected via a system bus 2 so that data communication is possible.

Further descriptions of the image reading unit 10, the control panel 20, the image forming unit 30, and the sheet storage unit 40 will be omitted. Hereinafter, the fixing device 50, the control device 70, the auxiliary storage device 120, and the network interface 130 will be described.

The fixing device 50 includes a fixing control circuit 51, a heating unit 52, and a press roller. The fixing control circuit 51 (e.g., a fixing controller) controls heating of the heating unit 52 according to an instruction from the control device 70. Specifically, the fixing control circuit 51 supplies power (e.g., electrical energy) to a heat-generating element to be heated (hereinafter, referred to as a "target heat-generating element") according to an instruction from the control device 70. On the other hand, the fixing control circuit 51 cuts off the supply of power to heat-generating elements (hereinafter, referred to as "non-target heat-generating elements") other than the target heat-generating element. For example, a power supply source and each heat-generating element may be connected through a switch.

In this case, the fixing control circuit 51 turns on a switch connected to the target heat-generating element to electrically couple the power supply source and the target heat-generating, thereby supplying power to the target heat-generating element. With this configuration, the target heat-generating element generates heat. The fixing control circuit 51 turns off a switch connected to the non-target heat-generating element to electrically decouple the power supply source and the non-target heat-generating element, thereby cutting off the supply of power to the non-target heat-generating element. With this configuration, the non-target heat-generating element does not generate heat.

The heating unit 52 heats the sheet. The heating unit 52 includes a plurality of heat-generating elements 53-1 to 53-N (where N is an integer of 2 or more) arranged in the main scanning direction. Heating of the plurality of heat-generating elements 53-1 to 53-N is independently controlled by switching the corresponding switches. For example, the heating unit 52 is a heat-generating body including the plurality of heat-generating elements 53-1 to 53-N. Identification information is assigned to each of the plurality of heat-generating elements 53-1 to 53-N, and the heat-generating elements 53-1 to 53-N can be individually distinguished. In the following description, when the heat-generating elements 53-1 to 53-N are not distinguished, the heat-generating elements 53-1 to 53-N are described as the heat-generating element 53.

Figure 3:
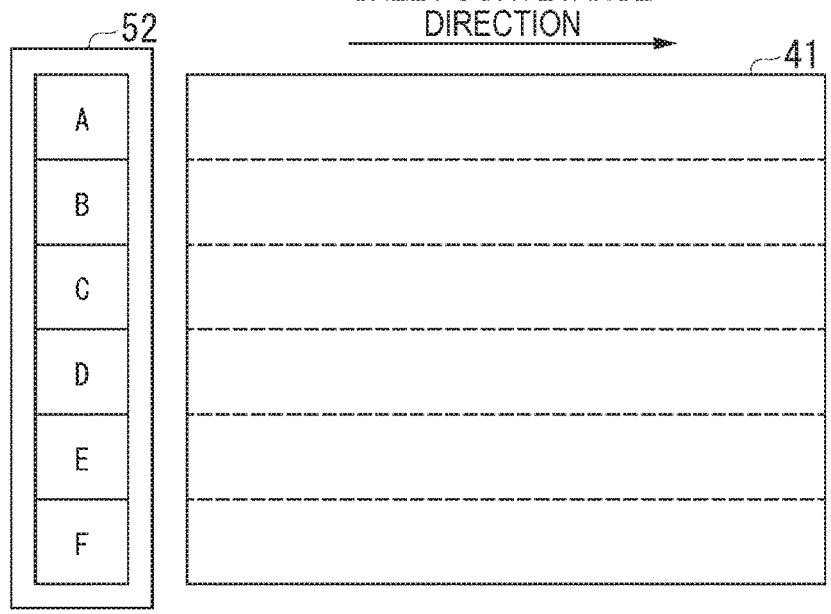
FIG. 3 is a diagram illustrating an example of heating regions of a plurality of heat-generating elements included in a heating unit in the embodiment.

FIG. 3 is a diagram for illustrating heating regions of the plurality of heat-generating elements 53-1 to 53-N included in the heating unit 52 in this embodiment. In this embodiment, a case where the heating unit 52 includes six heat-generating elements 53-1 to 53-6 will be described as an example, but the number of the heat-generating elements 53 is not limited to six (i.e., could be more or fewer than six in other embodiments). The heat-generating elements 53-1 to 53-6 each heat a corresponding range indicated by regions A to F, respectively. For example, the heat-generating element 53-1 heats the range indicated by the region A. Similarly, the heat-generating element 53-2 heats the region indicated by the region B. The heat-generating element 53-3 heats the range indicated by the region C. The heat-generating element 53-4 heats the range indicated by the region D. The heat-generating element 53-5 heats the range indicated by the region E. The heat-generating element 53-6 heats the range indicated by the region F.

The control device 70 includes a control unit 71 (e.g., a controller), a read only memory (ROM) 72, a random access memory (RAM) 73, and an image processing unit 74. The control unit 71 is, for example, a processor such as a central processing unit (CPU) or a graphics processing unit (GPU). The control unit 71 controls an operation of each functional unit of the image forming apparatus 1. The control unit 71 executes various processes by loading a program stored in the ROM 72 in the RAM 73 and executing the program. An application specific integrated circuit (ASIC) may have an appropriate function realized by the control unit 71. The ASIC is a dedicated circuit for realizing a specific function.

The ROM 72 stores a program for operating the control unit 71. The RAM 73 is a memory that temporarily stores data used by each functional unit included in the image forming apparatus 1. For example, the RAM 73 stores raster data obtained by converting print data. The RAM 73 may store digital data generated by the image reading unit 10. The RAM 73 may temporarily store a job and a job log.

The image processing unit 74 uses print data transmitted from an external device or print data read by the image reading unit 10 as input data, and performs image processing on the input data. The image processing unit 74 is configured by an integrated circuit for image processing such as a field-programmable gate array (FPGA) or the ASIC. The print data processed by the image processing unit 74 is temporarily stored in the auxiliary storage device 120, then converted into raster data by the control unit 71, and loaded on the RAM 73.

The image processing unit 74 reads the raster data loaded on the RAM 73, and converts the raster data into coded data for data storage. That is, the image processing unit 74 compresses the raster data. The image processing unit 74 scans the raster data to identify at least one region where an image to be printed is present. Here, the print data is divided into predetermined sections or regions, and the image processing unit 74 determines if an image to be printed is present in each region. The image processing unit 74 determines that an image is present in a region if the number of colored pixels in the region is equal to or greater than a threshold (e.g., a threshold quantity). Colored pixels are pixels whose numerical value representing a color is equal to or greater than a certain value in the raster data. On the other hand, the image processing unit 74 determines that an image is absent from a region if the number of colored pixels in the region is less than the threshold. By this processing, the image processing unit 74 avoids mistakenly identifying noise as an image.

The image processing unit 74 generates energization information for the front part and the rear part of each heat-generating element 53 in the sheet conveyance direction using the determination result of each region. The front part in the sheet conveyance direction refers to a front end part in the sheet conveyance direction when the print data is divided into predetermined sections. The rear part in the sheet conveyance direction refers to a rear end part in the sheet conveyance direction when the print data is divided into predetermined sections. The energization information is information indicating whether or not each heat-generating element 53 needs to be energized. For example, the energization information includes information indicating whether or not the front part and the rear part of each heat-generating element 53 need to be energized. For example, for each of the heat-generating elements 53-1 to 53-6, a value of "1" is shown when energization is necessary and a value of "0" is shown when energization is not necessary. The image processing unit 74 causes the auxiliary storage device 120 to store the generated coded data and energization information in association with each other. The image processing unit 74 may cause the RAM 73 to store the coded data and the energization information in association with each other. The image processing unit 74 executes a process of generating the coded data and the energization information by the number of print data.

The image processing unit 74 reads the coded data and the energization information stored in the auxiliary storage device 120 when executing printing. When a plurality of pieces of data to be printed are present, the image processing unit 74 reads out all coded data and energization information corresponding to the pieces of data to be printed. In the following description, a case where two pieces of data to be printed are present will be described. Here, it is assumed that the first print target data is first print data and the second print target data is second print data. In this case, the image processing unit 74 reads, from the auxiliary storage device 120, coded data and energization information corresponding to the first print data, and coded data and energization information corresponding to the second print data. The image processing unit 74 determines whether or not the coded data (hereinafter, referred to as "second coded data") corresponding to the second print data needs to be rotated, based on the read energization information. When the rotation of the second coded data is performed, the image processing unit 74 expands the second coded data while rotating the second coded data. For example, when the rotation of the second coded data is performed, the image processing unit 74 rotates the arrangement of the second coded data by 180°. On the other hand, when the rotation of the second coded data is not performed, the image processing unit 74 rotates the arrangement of the second coded data by 0°, that is, expands the second coded data without rotating the second coded data.

The auxiliary storage device 120 is, for example, a hard disk or a solid state drive (SSD), and stores various data. The various data is, for example, digital data, a job, a job log, coded data, and energization information.

The network interface 130 transmits and receives data to and from another apparatus. Here, the other apparatus is, for example, an information processing apparatus or user device such as a personal computer. The network interface 130 operates as an input interface, and receives print data or an instruction transmitted from another apparatus. The instruction transmitted from another apparatus is a print execution instruction or the like. The network interface 130 operates as an output interface and transmits data to another apparatus.

Figure 4:
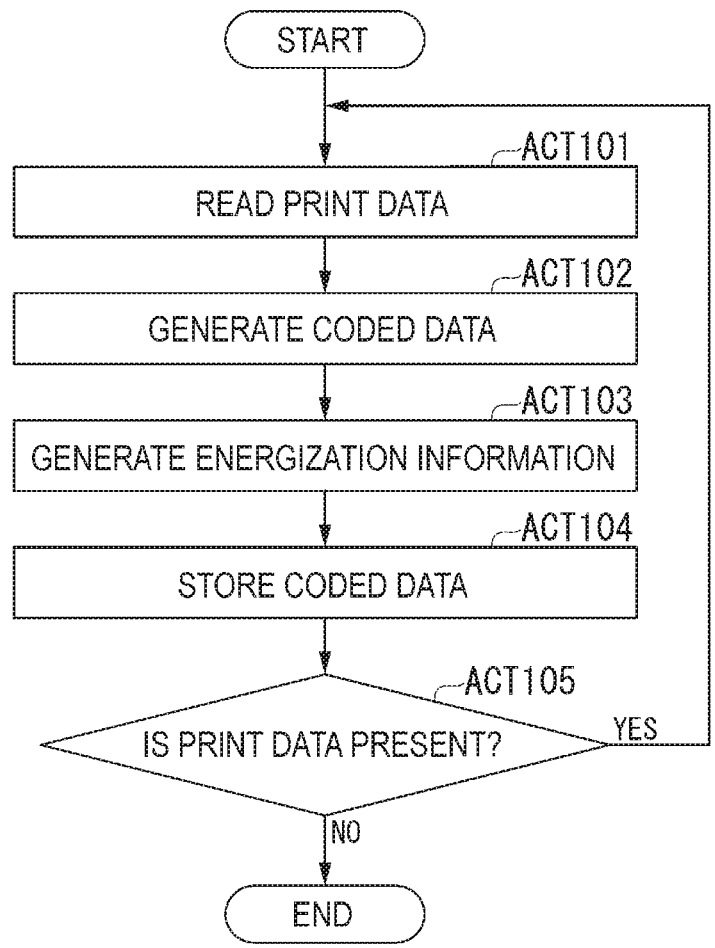
FIG. 4 is a flowchart illustrating a flow of an energization information generation process performed by the image forming apparatus in the embodiment.

FIG. 4 is a flowchart illustrating a flow of an energization information generation process performed by the image forming apparatus 1 according to this embodiment. It is assumed that the print data is converted into raster data and loaded on the RAM 73 when starting the process of FIG. 4. The image processing unit 74 reads the raster data from the RAM 73 (ACT 101). The image processing unit 74 converts the read raster data into coded data (ACT 102). The image processing unit 74 generates energization information based on the read raster data (ACT 103).

FIG. 5 is a diagram for illustrating a method for generating energization information in this embodiment. In FIG. 5, "A" to "F" in the main scanning direction represent heating regions of the heat-generating elements 53-1 to 53-6. "1" to "8" in the sheet conveyance direction, that is, in the sub-scanning direction, represent ranges when the raster data is divided at a predetermined interval in the sheet conveyance direction. Here, the range in the main scanning direction of "1" in the sheet conveyance direction is the front part, and the range in the main scanning direction of "8" in the sheet conveyance direction is the rear part. It is assumed that the print data includes an image 200. Each section divided by the ranges of "A" to "F" in the main scanning direction and the ranges of "1" to "8" in the sheet conveyance direction is a determination region for the presence or absence of an image.

In the example of FIG. 5, an image is present in the ranges of "A" and "B" in the main scanning direction from the front part to the rear part. For that reason, the heat-generating element 53-1 that heats the range of "A" in the main scanning direction and the heat-generating element 53-2 that heats the range of "B" in the main scanning direction are the target heat-generating elements. The image processing unit 74 determines that energization is necessary for the ranges of "A" and "B" in the front part and the rear part. The image processing unit 74 determines that energization is not necessary for the ranges of "C" to "F" in the front part and the rear part. As a result, the image processing unit 74 generates energization information as in FIG. 6 based on the print data illustrated in FIG. 5.

FIG. 6 is a diagram illustrating an example of energization information generated based on the print data illustrated in FIG. 5. The energization information illustrated in FIG. 6 includes a value of "1" in "A" and "B" of the front part and the rear part, and a value of "0" in "C" to "F".

Descriptions will be continued by referring back to FIG. 4. The image processing unit 74 stores the generated coded data in the auxiliary storage device 120 in association with the energization information (ACT 104). Thereafter, the image processing unit 74 determines whether or not other print data is present (ACT 105). When it is determined that other print data is present (YES in ACT 105), the image processing unit 74 reads the other print data and executes processes of ACT 101 and the subsequent ACTS. On the other hand, when it is determined that other print data is absent (NO in ACT 105), the image processing unit 74 ends the process of FIG. 4.

Next, a process when a plurality of pieces of print data are present will be described. FIGS. 7A and 7B are diagrams for illustrating a process when a plurality of pieces of print data are present in this embodiment. In FIGS. 7A and 7B, an example in which first print data and second print data are continuously printed is illustrated. In FIGS. 7A and 7B, "A" to "F" in the main scanning direction represent heating regions of the heat-generating elements 53-1 to 53-6. "1" to "8" in the sheet conveyance direction, that is, in the sub-scanning direction, represent ranges when the print data is divided at a predetermined interval in the sheet conveyance direction. Here, the range of "1" in the main scanning direction is the front part, and the range of "8" in the main scanning direction is the rear part. In FIGS. 7A and 7B, it is assumed that an image 200 is present in the first print data and an image 201 present in the second print data.

In this case, in the first print data, a portion from the front part to the rear part in the ranges of "A" and "B" is targeted for printing. That is, in the first print data, the heat-generating element 53-1 that heats the range of "A" and the heat-generating element 53-2 that heats the range of "B" are the target heat-generating elements. In the second print data, a portion from the front part to the rear part in the ranges of "E" and "F" is targeted for printing. That is, in the second print data, the heat-generating element 53-5 that heats the range of "E" and the heat-generating element 53-6 that heats the range of "F" are the target heat-generating elements. The image processing unit 74 generates energization information for each of the first print data and the second print data based on the result described above.

FIGS. 8A and 8B are diagrams illustrating an example of energization information of each print data in the example of FIGS. 7A and 7B. FIG. 8A represents energization information generated based on the first print data and FIG. 8B represents the energization information generated based on the second print data. In the example illustrated in FIG. 8B, the energization information when the arrangement of the second print data is rotated by 0° is illustrated. The energization information illustrated in FIG. 8A includes a value of "1" in "A" and "B" of the front part and the rear part, and a value of "0" in "C" to "F". The energization information illustrated in FIG. 8B includes a value of "1" in "E" and "F" of the front part and the rear part, and a value of "0" in "A" to "D".

On the other hand, the energization information when the arrangement of the second print data is rotated by 180° is as illustrated in FIG. 9. FIG. 9 is a diagram illustrating another example of energization information of each print data in the example of FIGS. 7A and 7B. The energization information illustrated in FIG. 9 includes a value of "1" in "A" and "B" of a front part and a rear part, and a value of "0" in "C" to "F".

Figure 10A:
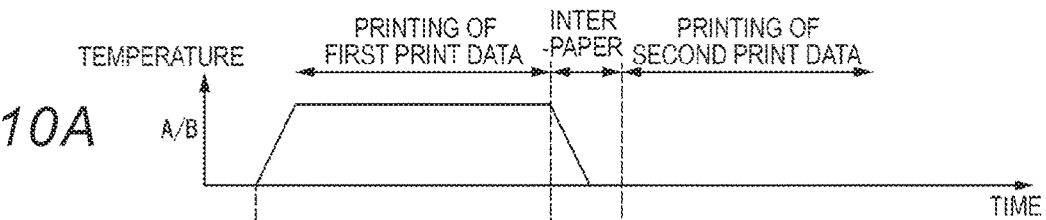
FIGS. 10A to 10D are graphs illustrating a time transition of the temperature of a fixing device and a time transition of supplied power, when the arrangement of second print data is rotated by 0°.
Figure 10B:
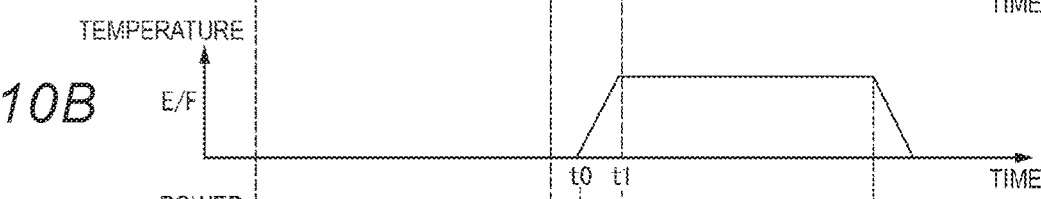
Figure 10C:
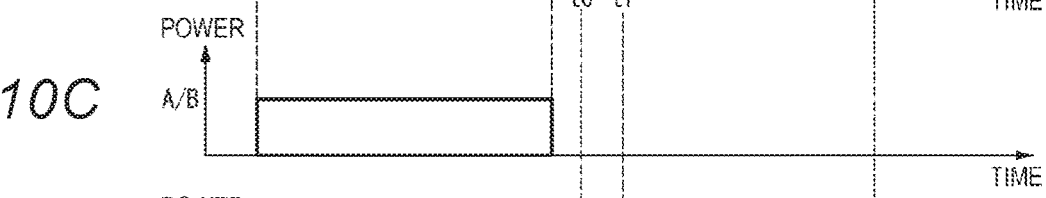
Figure 10D:
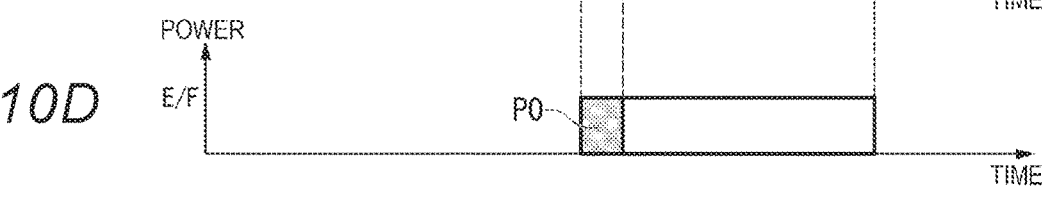

FIGS. 10A to 10D are graphs illustrating a time transition of the temperature (e.g., the change in temperature over time) of the fixing device 50 and a time transition of supplied power, when the arrangement of the second print data is rotated by 0°. FIG. 10A is a graph illustrating a time transition of temperature when power is supplied to the heat-generating elements 53-1 and 53-2 that heat the ranges of "A" and "B" in the fixing device 50. FIG. 10B is a graph illustrating a time transition of temperature when power is supplied to the heat-generating elements 53-5 and 53-6 that heat the ranges of "E" and "F" in the fixing device 50. FIG. 10C is a graph illustrating a time transition of power (e.g., the change in applied power over time) when power is supplied to the heat-generating elements 53-1 and 53-2 that heat the ranges of "A" and "B" in the fixing device 50. FIG. 10D is a graph illustrating a time transition of power when power is supplied to the heat-generating elements 53-5 and 53-6 that heat the ranges of "E" and "F" in the fixing device 50.

In the example illustrated in FIG. 10A, when printing the first print data, power is supplied to the heat-generating elements 53-1 and 53-2 that heat the ranges of "A" and "B". Then, when printing the second print data, power is supplied to the heat-generating elements 53-5 and 53-6 that heat the ranges of "E" and "F". In switching between the first print data and the second print data during printing, energization of the heat-generating elements 53-5 and 53-6 that heat the ranges of "E" and "F" is started from time t0. As a result, power for a region of P0 is used until time t1 when the sheet reaches the fixing device 50.

Figure 11A:
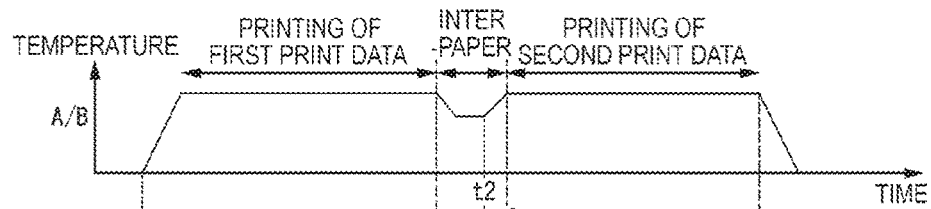
FIGS. 11A and 11B are graphs illustrating a time transition of the temperature of the fixing device and a time transition of supplied power, when the arrangement of the second print data is rotated by 180°.
Figure 11B:
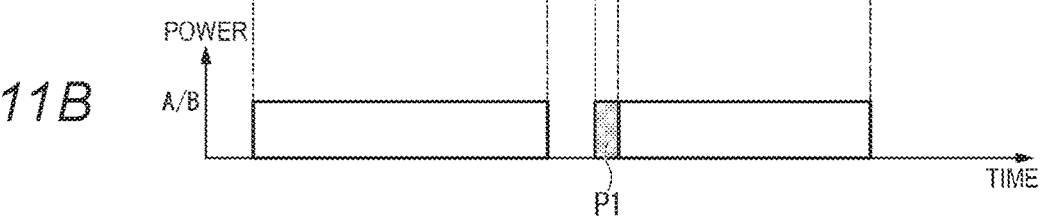

FIGS. 11A and 11B are graphs illustrating a time transition of temperature and the supplied power of the fixing device 50, when the arrangement of the second print data is rotated by 180°. FIG. 11A is a graph illustrating a time transition of temperature when power is supplied to the heat-generating elements 53-1 and 53-2 that heat the ranges of "A" and "B" in the fixing device 50. FIG. 11B is a graph illustrating a time transition of power when power is supplied to the heat-generating elements 53-1 and 53-2 that heat the ranges of "A" and "B" in the fixing device 50.

In the example illustrated in FIG. 11A, when printing the first print data and the second print data, power is supplied to the heat-generating elements 53-1 and 53-2 that heat the ranges of "A" and "B". In switching between the first print data and the second print data during printing, there is residual heat when printing the first print data. Accordingly, when energization of the heat-generating elements 53-1 and 53-2 is started at time t2, power for a region of P1 is used until time t3 when the sheet reaches the fixing device 50. For that reason, when FIGS. 10A to 10D and FIGS. 11A and 11B are compared, power consumption is P1<P0.

As described above, in a situation like FIGS. 7A and 7B, the power consumption becomes smaller when the arrangement of the second coded data is rotated by 180°. When printing the print data continuously, it can be understood that the power consumption becomes smaller when the energized state of the rear part of the first print data and the energized state of the front part of the second print data are made continuous.

By taking into consideration of the contents described above, the image processing unit 74 determines whether or not to rotate the second coded data based on the energization information of each of the continuous print data. Specifically, first, the image processing unit 74 performs a logical operation using the energization information of the rear part in the first print data and the energization information of the front part when the arrangement of the second print data is rotated by 0°. The image processing unit 74 performs a logical operation (for example, AND) using the energization information of the rear part in the first print data and the energization information of the front part when the arrangement of the second print data is rotated by 180°.

FIG. 12 is a diagram illustrating a result of the logical operation when the arrangement of the second print data is rotated by 0°. It is assumed that the energization information of the rear part in the first print data and the energization information of the front part of the second print data when the arrangement of the second print data is rotated by 0° are in a state of FIG. 12. In this case, the image processing unit 74 performs a logical operation using the energization information between the heat-generating elements 53 that heat the same range. For example, the image processing unit 74 performs an AND operation of the energization information between the heat-generating elements 53 that heat the same range. In the AND operation, the output is "0" when one or both inputs are "0," and the output is "1" when both inputs are "1." As a result, when the arrangement of the second print data is rotated by 0°, the result of the logical operation of each of the heat-generating elements 53 that heat the ranges of "A" to "F" in the main scanning direction becomes 0.

When the result of the AND operation is "1", it means that images are continuously present from the rear part of the first print data to the front part of the second print data. Accordingly, when the result of the AND operation is "1", it is more efficient to continuously perform energization when printing from the rear part of the first print data to the front part of the second print data. On the other hand, when the result of the AND operation is "0", it means that the images are not continuous from the rear part of the first print data to the front part of the second print data. Accordingly, when the result of the AND operation is "0", it is more efficient for energization to not be continuously performed when printing from the rear part of the first print data to the front part of the second print data.

FIG. 13 is a diagram illustrating a result of a logical operation when the arrangement of the second print data is rotated by 180°. It is assumed that data of the rear part included in the energization information of the first print data and data of the front part included in the energization information of the second print data are data illustrated in FIG. 13. In this case, the image processing unit 74 performs a logical operation (for example, AND) using the energization information between the heat-generating elements that heat the same range. As a result, when the arrangement of the second print data is rotated by 180°, the result of the first logical operation of the energization information in each of the heat-generating elements for "A" and "B" becomes 1. Then, when the arrangement of the second print data is rotated by 180°, the result of the logical operation of the energization information in each of the heat-generating elements for "C" to "F" becomes 0.

When taking into consideration of the results of FIGS. 12 and 13, the quantity of "1" results of the logical operation is larger when the arrangement of the second print data is rotated by 180°. The fact that the quantity of "1" results of the logical operation is larger means that the images are continuous across the subsequent sheets. In the examples illustrated in FIGS. 12 and 13, power consumption can be reduced when the arrangement of the second print data is rotated by 180° compared to when the arrangement of the second print data is rotated by 0°. For that reason, the image processing unit 74 determines to rotate the arrangement of the second print data by 180°. Hereinafter, it is assumed that the rotation condition is satisfied when the power consumption can be reduced by rotating the arrangement of the second print data by 180°.

Figure 14:
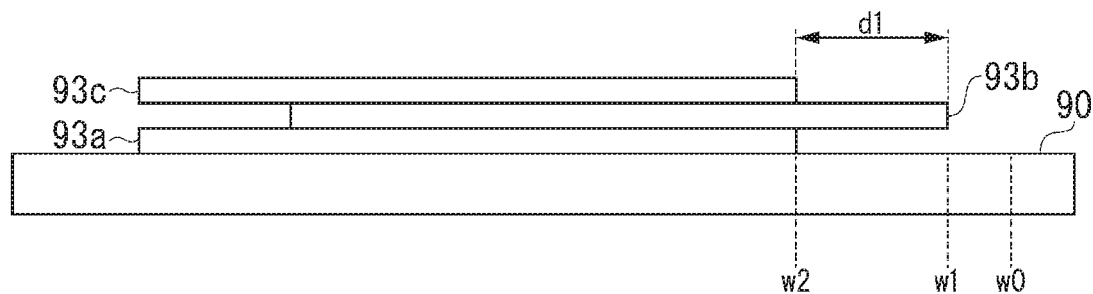
FIG. 14 is a diagram illustrating a specific example of a state of discharged sheets.
Figure 15:
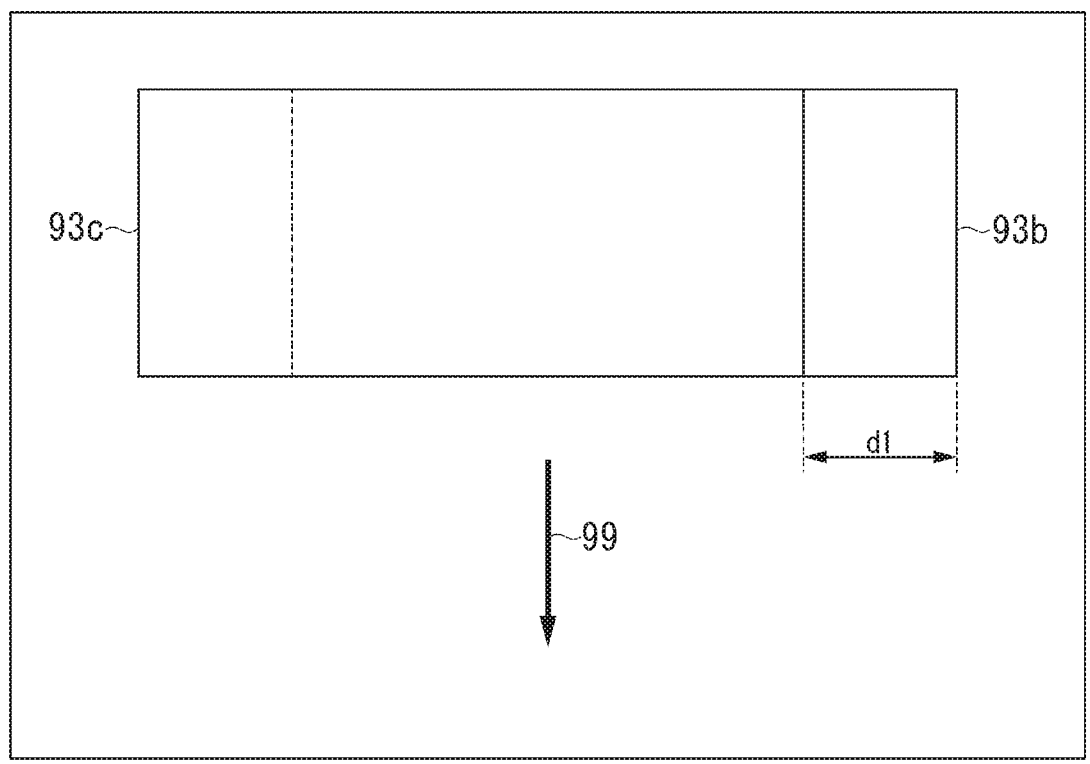
FIG. 15 is a diagram illustrating the specific example of the state of the discharged sheets.

FIGS. 14 and 15 are diagrams illustrating a specific example of a state of sheets after the sheet discharge device 91 in the embodiment discharged the sheets. FIG. 14 is a diagram in which the discharge tray 90 is viewed in the horizontal direction. FIG. 15 is a diagram in which the discharge tray 90 is viewed from above. In the specific example of FIGS. 14 and 15, a plurality of sheets 93 (93a, 93b, and 93c) are stacked in layers on the upper surface of the discharge tray 90. In FIGS. 14 and 15, sheets having two types of rotation amount are discharged. That is, the sheet 93a and the sheet 93c are sheets on which print data is rotated by a first rotation amount, and the sheet 93b is a sheet on which print data is rotated by a second rotation amount.

The sheet discharge device 91 can adjust a sheet discharge position when a sheet is discharged onto the sheet discharge tray 90 for each sheet by adjusting the sheet discharge position by the sheet discharge position adjuster 63. By such adjustment of the sheet discharge position, the sheet discharge device 91 discharges the sheet to the sheet discharge position corresponding to a rotation amount of the arrangement of the print data.

In the adjustment of the sheet discharge position, the sheet discharge position may be adjusted so that the position on the surface of the same sheet discharge tray 90 is different. The sheet discharge position may be adjusted such that the position on an axis (hereinafter, referred to as a "position deviation axis") orthogonal to an axis along an advancing direction (hereinafter, referred to as a "sheet discharge direction") when the sheet is discharged is different, for example. In FIGS. 1 and 15, the sheet discharge direction is indicated by an arrow 99. For example, in the adjustment of the sheet discharge position, the sheet discharge position may be adjusted so that the position on an axis (e.g., position deviation axis) in a direction (e.g., the left-and-right direction in FIG. 15) perpendicular to the sheet surface of FIG. 1 is different.

Sheets having the same rotation amount are discharged to the same position on the position deviation axis, and sheets having different rotation amounts are discharged to different positions on the position deviation axis. For example, it is assumed that the first rotation amount is 0° and the second rotation amount is 180°. In this case, the sheet discharge device 91 discharges the sheets to different sheet discharge positions for the sheets (93a and 93c) having the first rotation amount and the sheet (93b) having the second rotation amount. For example, it is assumed that the first rotation amount is 90° and the second rotation amount is 270°. In this case, the sheet discharge device 91 discharges the sheets to different sheet discharge positions for the sheets (93a and 93c) having the first rotation amount and the sheet (93b) having the second rotation amount.

As described above, the sheet for which the sheet discharge position is to be adjusted is a sheet for which it is not possible to determine whether the print data of the sheet corresponds to the first rotation amount or the second rotation amount unless the sheet discharge position is adjusted. Specifically, this is a case where the types of sheets used are the same. For example, A4 and A4R have the same sheet shape, but are different types of sheets because orientations at the time of printing are different. More specifically, for example, when the difference between the first rotation amount and the second rotation amount is 180°, the sheets used for printing are sheets of the same type. For that reason, the sheet discharged in this case is a sheet for which the determination described above cannot be performed. If two sheets were to be different types of sheets, it would be possible to determine whether the print data of the sheet corresponds to the first rotation amount or the second rotation amount without adjusting the sheet discharge position. By way of example, if sheets having the first rotation amount were to have a different size (e.g., width and/or length), a different material (e.g., paper color or thickness), or a different orientation than sheets having the second rotation amount, it would be possible to determine whether the print data of the sheet corresponds to the first rotation amount or the second rotation amount visually, regardless of the sheet discharge position.

The sheet is discharged such that the sheet discharge position of the sheets 93a and 93c having the first rotation amount and the sheet discharge position of the sheet 93b having the second rotation amount are deviated by a distance d1 along the position deviation axis. Specifically, the sheet discharge position may be controlled based on an amount of deviation from w0, which is the reference point of the sheet discharge position of the sheet. The sheet discharge positions of the sheets 93a and 93c, which are the sheets having the first rotation amount, are controlled as positions deviated by w2 from the reference point w0. The sheet discharge position of the sheet 93b, which is the sheet having the second rotation amount, is controlled as a position deviated by w1 from the reference point w0. The difference between w2 and w1 is d1. All of the reference points w0, w1, and w2 indicate points on the position deviation axis. The magnitude of the rotation amount and the amount of positional deviation (w1 and w2) are stored in the control device 70 in advance in association with each other.

Figure 16:
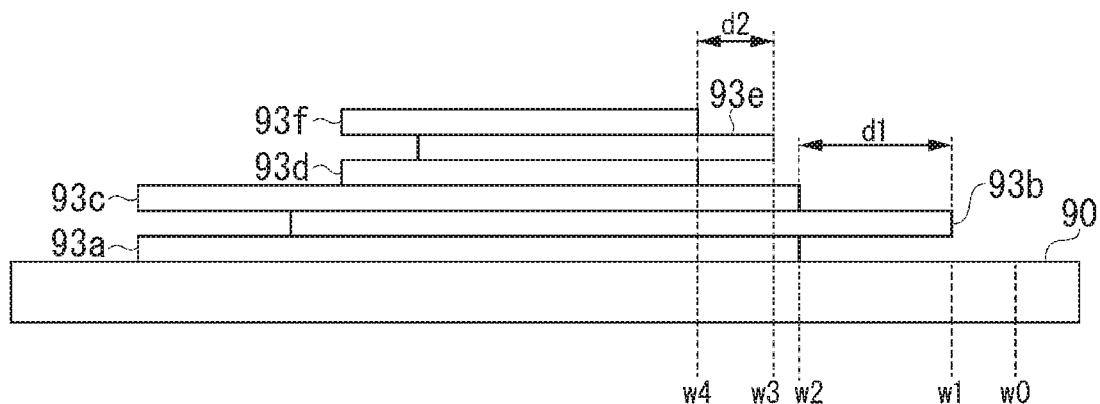
FIG. 16 is a diagram illustrating another specific example of a state of discharged sheets.
Figure 17:
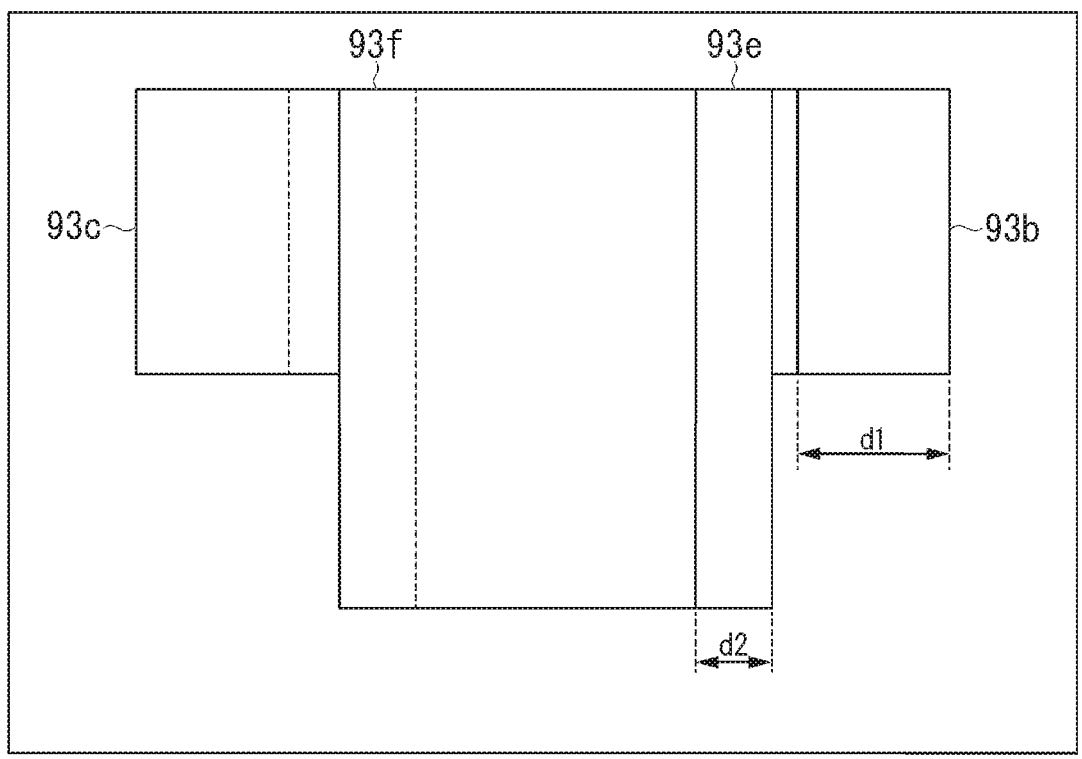
FIG. 17 is a diagram illustrating another specific example of the state of the discharged sheet.

FIGS. 16 and 17 are diagrams illustrating a specific example of the state of sheets after the sheet discharge device 91 discharges the sheets in the embodiment. FIG. 16 is a diagram in which the discharge tray 90 is viewed in the horizontal direction. FIG. 17 is a diagram in which the discharge tray 90 is viewed from above. In the specific example of FIGS. 16 and 17, a plurality of sheets 93 (93a, 93b, 93c, 93d, 93e, and 93f) are stacked in layers on the upper surface of the discharge tray 90. In FIGS. 16 and 17, sheets having four different rotation amounts are discharged. That is, the sheets 93a and 93c are sheets on which print data is rotated by a first rotation amount, and the sheet 93b is a sheet on which print data is rotated by a second rotation amount. Furthermore, the sheets 93d and 93f are sheets on which print data is rotated by a third rotation amount, and the sheet 93e is a sheet on which print data is rotated by a fourth rotation amount.

Sheets having the same rotation amount are discharged to the same position on the position deviation axis, and sheets having different rotation amounts are discharged to different positions on the position deviation axis. For example, it is assumed that the first rotation amount is 0°, the second rotation amount is 180°, the third rotation amount is 90°, and the fourth rotation amount is 270°. In this case, the sheet discharge device 91 discharges the sheets to different sheet discharge positions for the sheets (93a and 93c) having the first rotation amount and the sheet (93b) having the second rotation amount. Furthermore, the sheet discharge device 91 discharges the sheets to different sheet discharge positions for the sheets (93d and 93f) having the third rotation amount and the sheet (93e) having the fourth rotation amount.

The sheet is discharged such that the sheet discharge position of the sheets 93a and 93c having the first rotation amount and the sheet discharge position of the sheet 93b having the second rotation amount are deviated by d1. This control is performed as described in FIGS. 14 and 15. In the example of FIGS. 16 and 17, the sheet is discharged such that the sheet discharge position of the sheets 93d and 93f having the third rotation amount and the sheet discharge position of the sheet 93e having the fourth rotation amount are deviated by d2. The sheet discharge positions of the sheets 93d and 93f, which are the sheets having the third rotation amount, are controlled as positions deviated by w4 from the reference point w0. The sheet discharge position of the sheet 93e, which is the sheet having the fourth rotation amount, is controlled as a position deviated by w3 from the reference point w0. The difference between w4 and w3 is d2. All of the reference point w0, w1, w2, w3, and w4 indicate points on the position deviation axis. The magnitude of the rotation amount and the amount of positional deviation (w1, w2, w3, and w4) are stored in the control device 70 in advance in association with each other. d1 and d2 may be different values or the same value.

Figure 18:
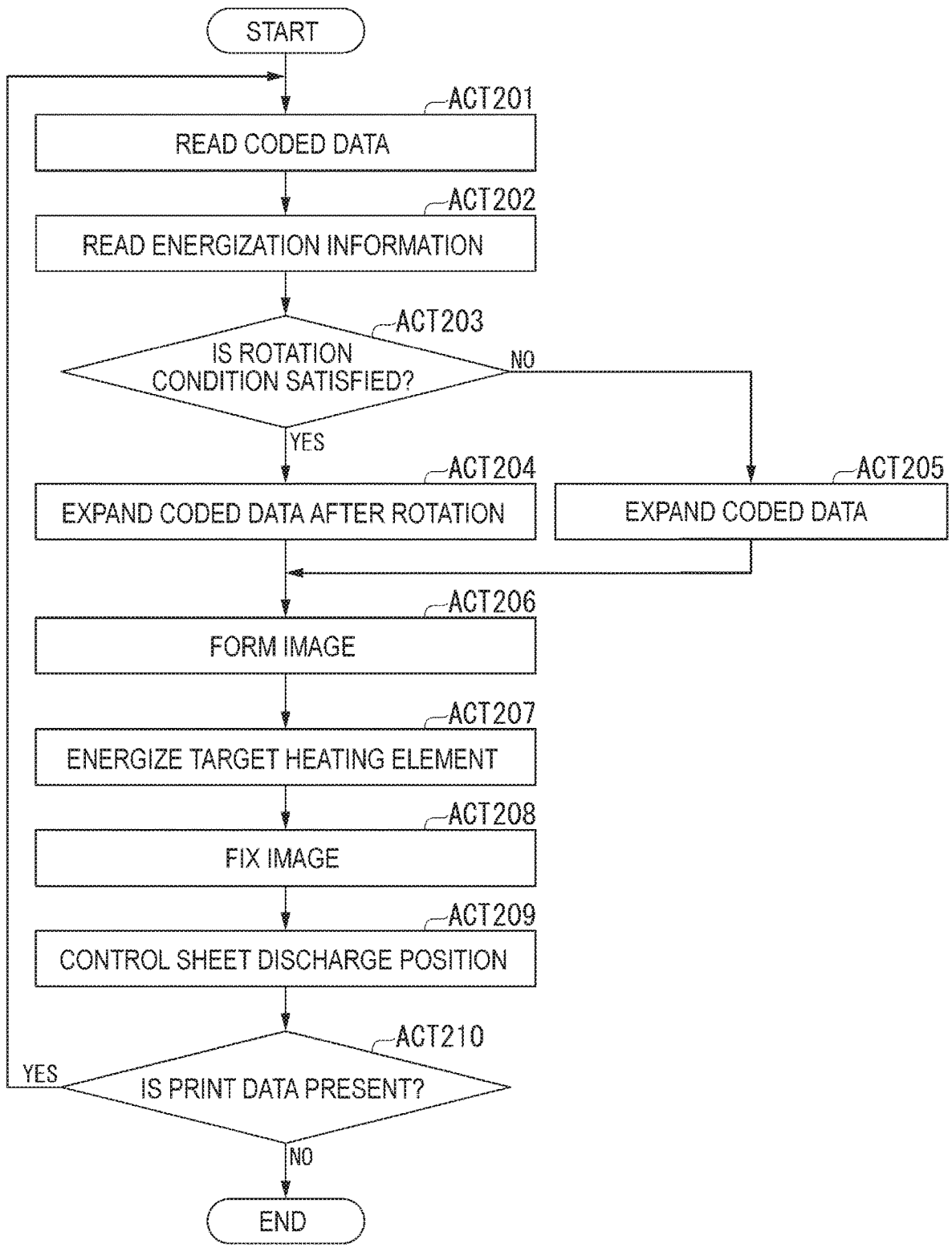
FIG. 18 is a flowchart illustrating a flow of a process when the image forming apparatus prints print data in the embodiment.

FIG. 18 is a flowchart illustrating a flow of a process when the image forming apparatus 1 prints print data in the embodiment. The process of FIG. 18 is executed when a print execution instruction is issued. The image processing unit 74 reads coded data stored in the auxiliary storage device 120 (ACT 201). The image processing unit 74 reads energization information stored in the auxiliary storage device 120 (ACT 202). The image processing unit 74 determines whether or not the rotation condition is satisfied based on the energization information (ACT 203). When it is determined that the rotation condition is satisfied (YES in ACT 203), the image processing unit 74 expands the second coded data while rotating the arrangement of the second coded data (ACT 204).

On the other hand, when it is determined that the rotation condition is not satisfied (NO in ACT 203), the image processing unit 74 expands the second coded data (ACT 205). That is, when the rotation condition is not satisfied, the image processing unit 74 does not rotate the arrangement of the second coded data. After processes of ACT 204 or ACT 205, the image forming unit 30 forms an image on a sheet based on the expanded print data (ACT 206). The fixing control circuit 51 energizes the target heat-generating element based on the expanded print data (ACT 207). Then, the image is fixed to the sheet by the sheet being heated by the target heat-generating element of the heating unit 52 (ACT 208).

The sheet on which the image was fixed is conveyed to the sheet discharge device 91. The sheet discharge device 91 discharges the sheet to a sheet discharge position corresponding to the rotation amount in ACT 204 and ACT 205 (ACT 209). The image processing unit 74 determines whether or not other print data is present (ACT 210). When it is determined that other print data is present (YES in ACT 210), the image processing unit 74 reads the other print data and executes processes of ACT 201 and subsequent ACTS. On the other hand, when it is determined that other print data is not present (NO in ACT 210), the image processing unit 74 ends the process of FIG. 18.

According to the image forming apparatus 1 configured as described above, the time required for printing can be reduced. Specifically, before compressing the print data, the image forming apparatus 1 generates the energization information of the rear part of the first print data and the energization information of the front part of the second print data. The image forming apparatus 1 determines, using the generated energization information, whether or not the second print data needs to be rotated. Then, the image forming apparatus 1 controls the rotation of the second print data according to the determination result. With this configuration, when the rotation of the second print data is necessary, the image forming apparatus 1 expands the second coded data while rotating the second coded data. On the other hand, when the rotation of the second print data is not necessary, the image forming apparatus 1 expands the second coded data without rotating the second coded data. Accordingly, it is not necessary to determine whether or not the print data needs to be rotated after expanding all print data when printing. For that reason, the time required for printing can be reduced.

When printing a plurality of pieces of print data continuously, the image forming apparatus 1 performs a logical operation based on the energization information of the rear part of the first print data and the energization information of the front part of the second print data. In this case, the image forming apparatus 1 uses the energization information of the front part when the second print data is rotated and the energization information of the front part when the second print data is not rotated. Specifically, first, the image forming apparatus 1 performs a logical operation based on the energization information of the rear part of the first print data and the energization information of the front part when the second print data is not rotated. Further, the image forming apparatus 1 performs a logical operation based on the energization information of the rear part of the first print data and the energization information of the front part when the second print data is rotated. Then, the image forming apparatus 1 determines whether or not the print data needs to be rotated, based on a result of a logical operation (for example, an AND operation) of each energization information. For example, the image forming apparatus 1 determines whether or not the print data needs to be rotated, based on the quantity of results of the logical operation that have the value "1". If the quantity of results of the logical operation that have the value "1" is large, the images are likely continuous. Accordingly, the image forming apparatus 1 determines whether or not the print data needs to be rotated, by assuming that rotation of the image will reduce power consumption if the quantity of results of the logical operation that have the value "1" is large. Then, the image forming apparatus 1 determines the rotation of the second print data, based on the determination result. Therefore, power consumption can be reduced.

The sheet discharge device 91 discharges the sheet to a position corresponding to the rotation amount of the image (i.e., print data) printed on the discharged sheet. In particular, when printing is performed on the same type of sheets even though the rotation amount of image is different, the sheets are discharged to different discharge positions according to the rotation amount. Thus, it is possible to easily determine the difference in rotation amount of the print data printed on each sheet without visually observing a printing surface or the like. For example, a user may easily and collectively acquire the sheets having the same rotation amount without acquiring the sheets having a different rotation amount.

MODIFICATION EXAMPLES

Hereinafter, a modification example of the image forming apparatus 1 will be described. The image processing unit 74 may generate energization information of the rear part of the first print data in the sub-scanning direction and energization information of the front part of the second print data in the sub-scanning direction. That is, the image processing unit 74 may not generate the energization information of the front part in the sub-scanning direction, in the first print data. The image processing unit 74 may not generate the energization information of the rear part in the sub-scanning direction, in the second print data. As described above, this is because, if energization information of the rear part is present in the first print data and energization information of the front part is present in the second print data, it is possible to determine whether or not the second print data needs to be rotated. With such a configuration, the amount of operation by the image processing unit 74 can be reduced.

When printing a plurality of pieces of print data continuously, the image forming apparatus 1 may change the printing order in consideration of the energization information of each print data. Here, three pieces of print data (i.e., first print data, second print data, and third print data) will be described as an example. Specifically, the image processing unit 74 generates the energization information of the front part and rear part of each print data, along with the generation of the coded data of each print data. When a print execution instruction is issued, the image processing unit 74 performs a logical operation on each combination pattern of the energization information of each print data. In this case, the image processing unit 74 also uses the energization information when the print data is rotated. The image processing unit 74 determines a combination in which the number of results of logical operation having the value "1" is large, as the printing order of the print data. For example, it is assumed that the order of the first print data, the third print data, and the second print data is a combination in which the number of results of logical operation having the value "1" is large (e.g., maximized). In this case, the image processing unit 74 determines this combination as the printing order. Then, the image processing unit 74 causes printing to be performed using the determined order information. With this configuration, the image processing unit 74 can efficiently execute printing by changing the printing order. Specifically, the image processing unit 74 determines the printing order so that switching of energization to the heat-generating element 53 is reduced by changing the printing order. Then, the image processing unit 74 changes the printing order so that printing is performed in the determined order. For that reason, power consumption can be reduced.

According to the image forming apparatus 1 of at least one embodiment described above, the image forming apparatus 1 includes the heating unit 52 and the image processing unit 74. The heating unit 52 includes a plurality of heat-generating elements 53-1 to 53-N. Before compressing the first print data and the second print data, the image processing unit 74 generates first energization information regarding the first print data and second energization information regarding the second print data. The image processing unit 74 determines whether or not to rotate the second print data during printing, based on the generated first energization information and second energization information. Then, the image processing unit 74 controls the rotation of the second print data according to the determination result, and causes the printing to be executed. With this configuration, it is not necessary to determine whether or not the print data needs to be rotated after expanding all print data when printing. For that reason, the time required for printing can be reduced.

Figure 19:
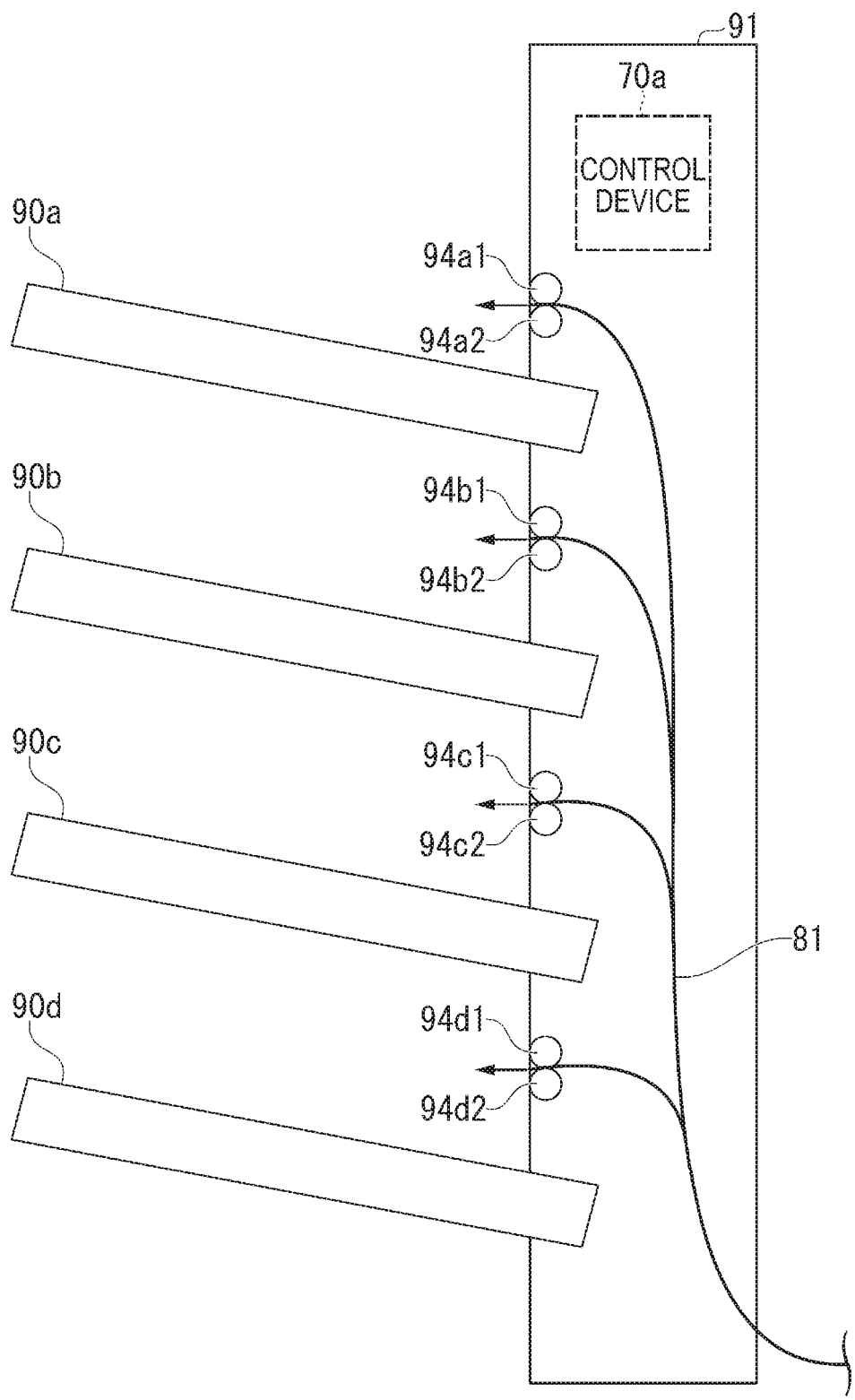
FIG. 19 is a diagram illustrating an example of a modified configuration.

FIG. 19 is a diagram illustrating a modification example of the sheet discharge device 91. In the example illustrated in FIG. 19, the sheet discharge device 91 includes a control device 70a, a conveyance unit 81, a plurality of sheet discharge trays 90 (90a, 90b, 90c, and 90d), and a plurality of sheet discharge rollers 94 (94a, 94b, 94c, and 94d). The control device 70a has the same configuration as the control device 70, and is installed with only the control function for the sheet discharge device 91. The image forming apparatus 1 notifies the control device 70a of information indicating the rotation amount of the print data for the sheet to be processed. The conveyance unit 81 conveys the sheet 41 discharged from the main body of the image forming apparatus 1. The conveyance unit 81 includes a conveyance path and a plurality of rollers. The conveyance path is a path along which the sheet 41 is conveyed. The rollers convey the sheet 41 by rotating under the control of the control device 70a.

The plurality of discharge trays 90 are provided at positions where sheets are discharged from different discharge rollers 94, respectively. For example, the discharge tray 90a is provided at a position where the sheet is discharged from the discharge roller 94a (94a1 and 94a2). The discharge tray 90b is provided at a position where the sheet is discharged from the discharge roller 94b (94b1 and 94b2). The discharge tray 90c is provided at a position where the sheet is discharged from the discharge roller 94c (94c1 and 94c2). The discharge tray 90d is provided at a position where the sheet is discharged from the discharge roller 94d (94d1 and

94*d*2). Each sheet discharge tray 90 is provided at a position where a sheet discharged from a sheet discharge roller 94 different from a sheet discharge roller 94 corresponding to the sheet discharge tray 90 is not mixed.

The discharge rollers 94*a*1 and 94*a*2 are installed at positions facing each other. The sheet discharge rollers 94*a*1 and 94*a*2 discharge the sheet 41 that is discharged from the image forming apparatus 1 and passed through the conveyance unit 81 to the sheet discharge tray 90*a*. The discharge rollers 94*b*1 and 94*b*2 are installed at positions facing each other. The sheet discharge rollers 94*b*1 and 94*b*2 discharge the sheet 41 that is discharged from the image forming apparatus 1 and passed through the conveyance unit 81 to the sheet discharge tray 90*b*. The discharge rollers 94*c*1 and 94*c*2 are installed at positions facing each other. The sheet discharge rollers 94*c*1 and 94*c*2 discharge the sheet 41 that is discharged from the image forming apparatus 1 and passed through the conveyance unit 81 to the sheet discharge tray 90*c*. The discharge rollers 94*d*1 and 94*d*2 are installed at positions facing each other. The sheet discharge rollers 94*d*1 and 94*d*2 discharge the sheet 41 that is discharged from the image forming apparatus 1 and passed through the conveyance unit 81 to the sheet discharge tray 90*d*.

In the modification example illustrated in FIG. 19, the adjustment of the sheet discharge position of the sheet is realized by changing the sheet discharge tray 90 to which the sheet is discharged. For example, the control device 70*a* discharges the sheet having the first rotation amount to the sheet discharge tray 90*a* by controlling the conveyance unit 81, the sheet discharge roller 94*a*1, and the sheet discharge roller 94*a*2. The control device 70*a* discharges the sheet having the second rotation amount to the sheet discharge tray 90*b* by controlling the conveyance unit 81, the sheet discharge roller 94*b*, and the sheet discharge roller 94*b*2. The control device 70*a* discharge the sheet having the third rotation amount to the sheet discharge tray 90*c* by controlling the conveyance unit 81, the sheet discharge roller 94*c*1, and the sheet discharge roller 94*c*2. The control device 70*a* discharges the sheet having the fourth rotation amount to the sheet discharge tray 90*d* by controlling the conveyance unit 81, the sheet discharge roller 94*d*1, and the sheet discharge roller 94*d*2. With this configuration, only the sheets having the same rotation amount are discharged to the same discharge tray 90. Therefore, even in the configuration of the modification example, the same effect as that of the sheet discharge device 91 described above can be obtained.

In the modification example illustrated in FIG. 19, if the sheets are different types, the control device 70*a* may discharge the sheets to the same discharge tray 90 even if the rotation amounts are different. For example, the control device 70*a* may discharge a sheet having a rotation amount of 0° and a sheet having a rotation amount of 90° to the sheet discharge tray 90*a* by controlling the conveyance unit 81, the sheet discharge roller 94*a*1, and the sheet discharge roller 94*a*2. For example, the control device 70*a* may discharge a sheet having a rotation amount of 180° and a sheet having a rotation amount of 270° to the sheet discharge tray 90*b* by controlling the conveyance unit 81, the sheet discharge roller 94*b*1, and the sheet discharge roller 94*b*2. For example, the control device 70*a* may discharge a sheet having a rotation amount of 0° and a sheet having a rotation amount of 270° to the sheet discharge tray 90*a* by controlling the conveyance unit 81, the sheet discharge roller 94*a*1, and the sheet discharge roller 94*a*2. For example, the control device 70*a* may discharge a sheet having a rotation amount of 180° and a sheet having a rotation amount of 90° to the sheet discharge tray 90*b* by controlling the conveyance unit 81, the sheet discharge roller 94*b*1, and the sheet discharge roller 94*b*2.

Figure 20:
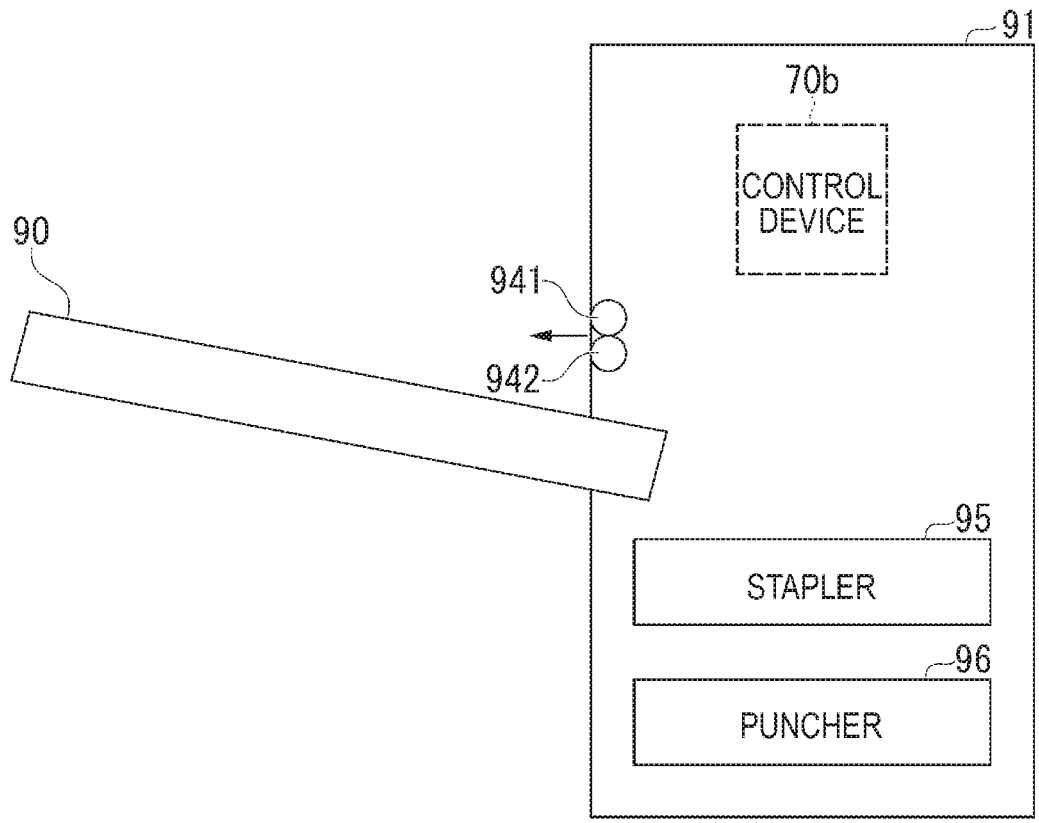
FIG. 20 is a diagram illustrating another example of the modified configuration.

FIG. 20 is a diagram illustrating another modification example of the sheet discharge device 91. In the example illustrated in FIG. 20, the sheet discharge device 91 includes a control device 70*b*, a conveyance unit, the sheet discharge tray 90, sheet discharge rollers 941 and 942, a stapler 95, and a puncher 96 (e.g., a hole puncher). The control device 70*b* has the same configuration as the control device 70, and is installed with control for the sheet discharge device 91 and process control in the modification example. The image forming apparatus 1 notifies the control device 70*b* of information indicating the rotation amount of the print data for the sheet to be processed. The conveyance unit conveys the sheet 41 discharged from the main body of the image forming apparatus 1. The conveyance unit includes a conveyance path and a plurality of rollers. The conveyance path is a path along which the sheet 41 is conveyed. The rollers convey the sheet 41 by rotating under the control of the control device 70*a*.

The stapler 95 staples a plurality of sheets to be processed. When it is set to perform the process of rotating the print data described above, the control device 70 of the image forming apparatus 1 may perform control so that the stapling function using the stapler 95 cannot be selected in the display of the control panel 20 such that the stapler 95 is disabled. For example, the display of the button for selecting the stapling function may be displayed in a different manner (for example, grayed out) from other selectable buttons.

The puncher 96 punches one or a plurality of sheets to be processed. The puncher 96 includes a mechanism for changing the relative position between a sheet punching instrument and the sheet. The control device 70*b* controls the puncher 96 to perform the punching process at a position corresponding to the rotation amount of the print data. For example, the control device 70*b* makes a hole in a predetermined region near the first side of the sheet when the rotation amount is the first rotation amount, and makes a hole in a predetermined region near the second side of the sheet when the rotation amount is the second rotation amount. The second side is positioned opposite the first side.

Figure 21:
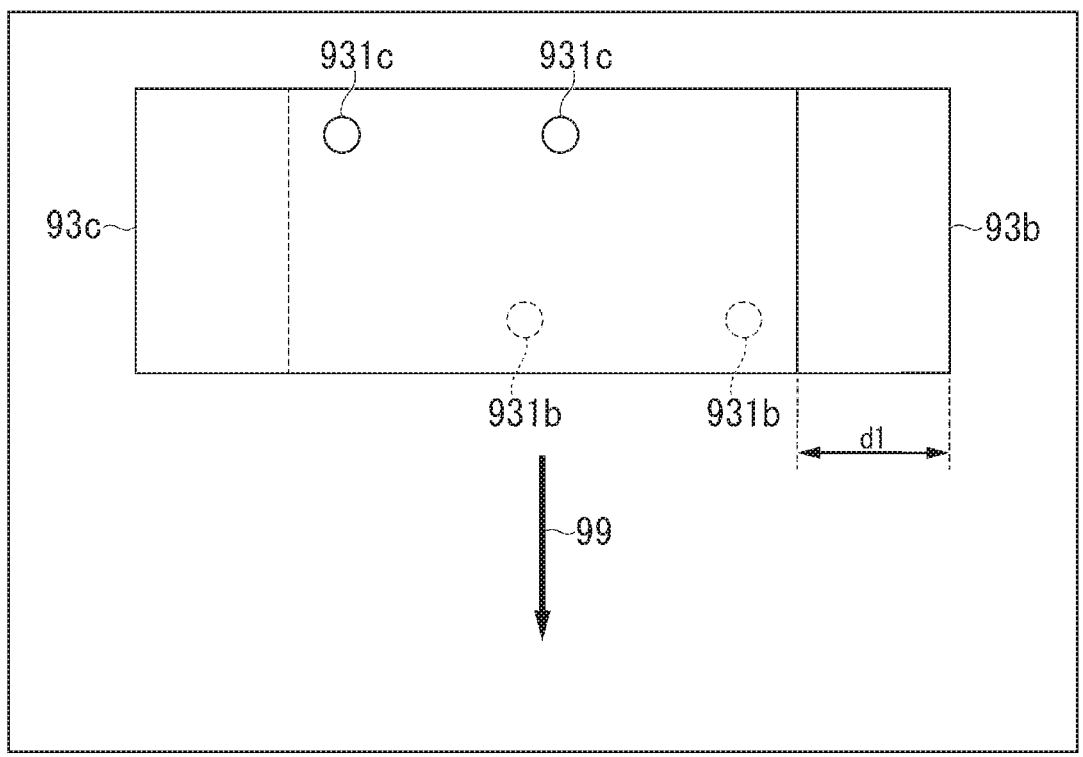
FIG. 21 is a diagram illustrating a state of sheets discharged by a sheet discharge device including a puncher.

FIG. 21 is a diagram illustrating a state of sheets discharged by the sheet discharge device 91 including the puncher 96. Except that holes are punched, the state of FIG. 21 is the same as the state illustrated in FIG. 15. In the sheet 93*c*, holes 931*c* are formed in a predetermined region near a side positioned on the upper side of the figure. In the sheet 93*b*, holes 931*b* are formed in a predetermined region near a side positioned on the lower side of the figure.

Some functions of the image forming apparatus 1 and the sheet discharge device 91 in the embodiment described above may be realized by a computer. In that case, a program for realizing those functions is recorded on a computer-readable recording medium. Then, the present disclosure may be realized by causing a computer system to read and execute a program recorded on a recording medium on which the program described above is recorded. Here, the "computer system" includes an operating system and hardware such as peripheral devices. The "computer-readable recording medium" refers to a portable medium, a storage device, or the like. The portable medium is a flexible disk, a magneto-optical disk, a ROM, a CD-ROM, or the like. The storage device is a hard disk or the like built in the computer system. Furthermore, the "computer-readable recording medium" dynamically stores the program for a short time, like a communication line when transmitting the program via a communication channel. The communication channel is a network such as the Internet or a telephone line. The "computer-readable recording medium" may be a volatile memory inside a computer system serving as a server or a client. The volatile memory stores programs for a certain period of time. The program may be for realizing some of the functions described above. The program described above may be a program that can realize the functions described above in combination with a program already recorded in the computer system.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sheet discharge device comprising:
   at least one sheet discharge tray configured to receive discharged sheets;
   a sheet discharge position adjustment actuator configured to adjust discharge positions of the discharged sheets on the at least one sheet discharge tray; and
   a controller configured to:
      compare a first rotation amount of first print data printed on a first sheet with a second rotation amount of second print data printed on a second sheet;
      in response to a determination that the first rotation amount is different than the second rotation amount, control the sheet discharge position adjustment actuator to (a) discharge the first sheet to a first discharge position and (b) discharge the second sheet to a second discharge position different than the first discharge position;
      compare the first rotation amount of the first print data printed on the first sheet and the second rotation amount of the second print data printed on the second sheet with a third rotation amount of third print data printed on a third sheet; and
      in response to a determination that the third rotation amount is different than the first rotation amount and the second rotation amount, control the discharge position adjustment actuator to discharge the third sheet to a third discharge position different than the first discharge position and the second discharge position.

2. The sheet discharge device of claim 1, wherein:
   the at least one sheet discharge tray includes a first sheet discharge tray; and
   the first discharge position of the first sheet and the second discharge position of the second sheet are both located on the first sheet discharge tray.

3. The sheet discharge device of claim 2, wherein
   the first sheet and the second sheet are discharged onto the first sheet discharge tray in a sheet discharge direction, and a position deviation axis is defined orthogonal to the sheet discharge direction; and
   the first discharge position of the first sheet and the second discharge position of the second sheet are offset from one another along the position deviation axis.

4. The sheet discharge device of claim 1, wherein the controller is configured to:
   compare the first rotation amount of the first print data printed on the first sheet, the second rotation amount of the second print data printed on the second sheet, and the third rotation amount of the third print data printed on the third sheet with a fourth rotation amount of fourth print data printed on a fourth sheet; and
   in response to a determination that the fourth rotation amount is different than the first rotation amount, the second rotation amount, and the third rotation amount, control the discharge position adjustment actuator to discharge the fourth sheet to a fourth discharge position different than the first discharge position, the second discharge position, and the third discharge position.

5. The sheet discharge device of claim 4, wherein the first rotation amount is 0°, the second rotation amount is 180°, the third rotation amount is 90°, and the fourth rotation amount is 270°.

6. The sheet discharge device of claim 1, further comprising a hole puncher, wherein the controller is configured to:
   determine a first position for a first hole in the first sheet based on the first rotation amount;
   determine a second position for a second hole in the second sheet based on the second rotation amount; and
   control the hole puncher to form the first hole in the first sheet at the first position and the second hole in the second sheet at the second position.

7. The sheet discharge device of claim 6, wherein
   when the controller determines that the first rotation amount is different than the second rotation amount, the first position of the first hole is in a first predetermined region near a first side of the first sheet, and the second position of the second hole is in a second predetermined region near a second side of the second sheet; and
   the second side is positioned opposite the first side.

8. The sheet discharge device of claim 1, wherein the first rotation amount is 0° and the second rotation amount is 180°.

9. The sheet discharge device of claim 1, further comprising:
   a stapler configured to staple two or more sheets together, wherein the controller is configured to:
      disable the stapler to prevent the stapler from stapling the first sheet and the second sheet together when the first sheet and the second sheet are discharged to different positions.

10. The sheet discharge device of claim 1, wherein the controller is configured to:
    in response to a determination that the first rotation amount is the same as the second rotation amount, control the sheet discharge position adjustment actuator to discharge both the first sheet and the second sheet to the first discharge position.

11. A sheet discharge device comprising:
    a first sheet discharge tray and a second sheet discharge tray configured to receive discharged sheets;
    a sheet discharge position adjustment actuator configured to adjust discharge positions of the discharged sheets on the first discharge tray and the second discharge tray; and
    a controller configured to:
       compare a first rotation amount of first print data printed on a first sheet with a second rotation amount of second print data printed on a second sheet; and
       in response to a determination that the first rotation amount is different than the second rotation amount, control the sheet discharge position adjustment actuator to (a) discharge the first sheet to a first discharge position on the first sheet discharge tray and (b) discharge the second sheet to a second discharge position on the second sheet discharge tray.

12. The sheet discharge device of claim 11, wherein the controller is configured to:
   determine if the first sheet and a third sheet are different types of sheets; and
   in response to a determination that the first sheet and the third sheet are different types of sheets, control the sheet discharge position adjustment actuator to discharge the first sheet and the third sheet onto the first sheet discharge tray.

13. The sheet discharge device of claim 11, wherein the controller is configured to:
   determine if the first sheet and the second sheet are different types of sheets; and
   in response to a determination that the first sheet and the second sheet are different types of sheets, control the sheet discharge position adjustment actuator to discharge both the first sheet and the second sheet to the first discharge position.

14. An image forming apparatus comprising:
   a heating unit that includes a plurality of heat-generating elements arranged in a main scanning direction, each of the heat-generating elements being independently controlled to heat a predetermined heating region;
   an image forming unit configured to:
      generate (a) first energization information indicating whether or not the plurality of heat-generating elements need to be energized in at least a rear part of first print data in a sub-scanning direction and (b) second energization information indicating whether or not the plurality of heat-generating elements need to be energized in at least a front part of second print data in the sub-scanning direction,
      determine a first rotation amount of the first print data and a second rotation amount of the second print data based on the first energization information and the second energization information;
      print the first print data on a first sheet, the first print data being oriented on the first sheet according to the first rotation amount; and
      print the second print data on a second sheet, the second print data being oriented on the second sheet according to the second rotation amount; and
   a discharge unit configured to discharge the first sheet and the second sheet to different positions in response to the first rotation amount being different than the second rotation amount.

15. The image forming apparatus of claim 14, wherein the image forming unit is configured to compress the first print data and the second print data after generating the first energization information and the second energization information.

16. The image forming apparatus of claim 14, wherein:
   the discharge unit includes a sheet discharge tray; and
   in response to the first rotation amount being different than the second rotation amount, the discharge unit is configured to (a) discharge the first sheet to a first discharge position on the sheet discharge tray and (b) discharge the second sheet to a second discharge position on the sheet discharge tray, the first discharge position being different than the second discharge position.

17. The image forming apparatus of claim 14, wherein:
   the discharge unit includes a first sheet discharge tray and a second sheet discharge tray; and
   in response to the first rotation amount being different than the second rotation amount, the discharge unit is configured to (a) discharge the first sheet onto the first sheet discharge tray and (b) discharge the second sheet onto the second sheet discharge tray.

* * * * *